(12) United States Patent
Chang et al.

(10) Patent No.: US 8,059,521 B2
(45) Date of Patent: Nov. 15, 2011

(54) OPTICAL RECORDING CARRIER, SIGNAL GENERATING APPARATUS, INFORMATION RECORDING METHOD, AND INFORMATION READING APPARATUS

(75) Inventors: Sheng-Li Chang, Hsinchu County (TW); Ji-Wen Kuo, Hsinchu (TW); Che-Kuo Hsu, Taipei County (TW); Feng-Hsiang Lo, Hsinchu County (TW); Jung-Po Chen, Nantou County (TW); Tzuan-Ren Jeng, Hsinchu (TW); Kuo-Chi Chiu, Hsinchu County (TW)

(73) Assignee: Industrial Technology Research Institute, Hsinchu (TW)

( * ) Notice: Subject to any disclaimer, the term of this patent is extended or adjusted under 35 U.S.C. 154(b) by 863 days.

(21) Appl. No.: 11/944,637

(22) Filed: Nov. 26, 2007

(65) Prior Publication Data

US 2008/0170489 A1    Jul. 17, 2008

(30) Foreign Application Priority Data

Jan. 11, 2007 (TW) ................ 96101044 A
Sep. 6, 2007 (TW) ................ 96133225 A

(51) Int. Cl.
- G11B 7/24 (2006.01)
- G11B 3/70 (2006.01)
- G11B 5/84 (2006.01)
- G11B 7/26 (2006.01)
- G11B 7/00 (2006.01)

(52) U.S. Cl. .......... 369/275.1; 369/275.3; 369/283; 369/44.13

(58) Field of Classification Search ........ 369/275.1, 369/60.01; 428/64.1; 430/321, 270.13, 270.11, 430/270.1
See application file for complete search history.

(56) References Cited

U.S. PATENT DOCUMENTS

| 4,238,843 A | 12/1980 | Carasso et al. |
| 4,363,116 A | 12/1982 | Kleuters et al. |
| 5,023,856 A | 6/1991 | Raaymakers et al. |

(Continued)

FOREIGN PATENT DOCUMENTS

CN    1249506    4/2000

(Continued)

OTHER PUBLICATIONS

"Office Action of Taiwan Counterpart Application", issued on Apr. 13, 2011, p. 1-p. 8, in which the listed references were cited.

Primary Examiner — Joseph Haley
Assistant Examiner — Nicholas Lee
(74) Attorney, Agent, or Firm — Jianq Chyun IP Office

(57) ABSTRACT

An optical recoding carrier and an information recording method applying an amplitude shift keying (ASK) method or further a DC-biased ASK method are provided, wherein at least one periodically undulated section and at least one non-periodically undulated section are formed on the optical recording carrier to indicate specific information. The information recording method can be embodied as an addressing method of an optical disk for recording address information of tracks of the optical disk. A continuous track structure is provided on the optical recording carrier to save the available recording space and improve the information reading precision of the optical recording carrier. Furthermore, a signal generating apparatus and an information reading apparatus applied in the information recording method are provided.

35 Claims, 14 Drawing Sheets

U.S. PATENT DOCUMENTS

| | | |
|---|---|---|
| 5,051,836 A | 9/1991 | Yokogawa et al. |
| 6,097,695 A | 8/2000 | Kobayashi |
| 2002/0172139 A1 | 11/2002 | Kondo et al. |
| 2004/0252602 A1* | 12/2004 | Muzio et al. ............... 369/47.19 |
| 2006/0028970 A1* | 2/2006 | Kondo et al. .............. 369/275.1 |
| 2006/0114765 A1* | 6/2006 | Meinders ................... 369/44.13 |
| 2007/0109940 A1* | 5/2007 | Ando et al. ................ 369/59.25 |

FOREIGN PATENT DOCUMENTS

| | | |
|---|---|---|
| CN | 1842861 | 10/2006 |
| TW | 200414127 | 8/2004 |
| TW | 1233607 | 6/2005 |
| TW | 200519903 | 6/2005 |

* cited by examiner

| | Wave Bit Set | | |
|---|---|---|---|
| SYNC PATTERN | 1 | 1 | 1 |
| PATTERN OF DIGITAL DATA "1" | 0 | 1 | 0 |
| PATTERN OF DIGITAL DATA "0" | 0 | 0 | 1 |
| CLOCK PATTERN | N | N | N |

OPTICAL RECORDING CARRIER, SIGNAL GENERATING APPARATUS, INFORMATION RECORDING METHOD, AND INFORMATION READING APPARATUS

CROSS-REFERENCE TO RELATED APPLICATION

This application claims the priority benefit of Taiwan applications serial no. 96101044, filed on Jan. 11, 2007 and serial no. 96133225, filed on Sep. 6, 2007. The entity of each of the above-mentioned applications is hereby incorporated by reference herein and made a part of specification.

BACKGROUND OF THE INVENTION

1. Field of the Invention

The present invention generally relates to an optical recording carrier applying an amplitude shift keying (ASK) method for recording information, an information recording method applying the ASK method, and a reading apparatus and a generating apparatus for reading and generating the information.

2. Description of Related Art

Presently, different types of optical disks in the market have different addressing structures and methods. For example, CD-R/-RW, DVD-R/-RW, DVD+R/+RW, and DVD-RAM use physical identification data (PID) for indicating address information so as to identify the physical positions of tracks on an optical disk. The PID is usually pre-recorded on the optical disk during the fabrication process of the optical disk.

Among existing addressing techniques, the addressing technique adopted by CD-R/RW optical disk is to pre-record the address information on grooves of an optical disk through frequency modulation (i.e. to embed the address information in the grooves) so that the data and the address information can be read together from the groove structure by a player and the action of the pickup head can be conveniently controlled. Besides, an addressing structure referred as land pre-pits is adopted by DVD-R/-RW optical disk, and which is to pre-record pits on the land area of an optical disk for indicating the address information. Moreover, the addressing technique adopted by DVD+R/+RW optical disk is to embed the address information into the grooves through phase modulation, and the addressing technique adopted by DVD-RAM optical disk is to arrange the address information on the tracks of an optical disk in the form of embossed pits so as to divide the tracks into different sections.

SUMMARY OF THE INVENTION

Accordingly, the present invention is directed to an optical recording carrier having continuous tracks, wherein the recording capacity of the optical recording carrier is not reduced by physical identification data (PID, such as embossed pits) formed on the optical recording carrier.

The present invention is directed to an optical recording carrier which records information through amplitude shift keying (ASK), wherein the recorded information may be address information of tracks on the optical recording carrier.

The present invention is further directed to an information reading apparatus or an information generating apparatus for reading or generating the information on foregoing optical recording carrier.

The present invention provides an optical recording carrier including a first substrate and a data read/write medium. The first substrate has an information track, and the information track includes at least one periodically undulated section and at least one non-periodically undulated section for indicating an information. The data read/write medium is on the information track.

The present invention provides an information reading apparatus suitable for reading the information recorded in foregoing optical recording carrier. The information reading apparatus includes an optical pickup head, a photo detector, a clock signal generator, and a decoder circuit. The optical pickup head emits a read beam on the information track of the optical recording carrier, and the photo detector receives a reflected beam from the information track so as to obtain a push-pull signal. The push-pull signal includes at least one periodically undulated waveform and at least one non-periodically undulated waveform respectively corresponding to the periodically undulated section and the non-periodically undulated section on the information track. The clock signal generator generates a clock signal according to the push-pull signal, and the decoder circuit decodes the push-pull signal according to the clock signal so as to obtain the information.

The information reading apparatus may further include an integrate and dump circuit or a sampling circuit disposed between the photo detector and the decoder circuit for detecting the non-periodically undulated waveform in the push-pull signal. Besides, the clock signal may be further processed respectively by a frequency divider circuit or a frequency multiplier circuit so that the integrate and dump circuit or the sampling circuit can process the push-pull signal according to the clock signal.

The information recorded in the optical recoding carrier may be an address information of the optical recording carrier, and the non-periodically undulated waveform may be a waveform having a bias, so that a DC-biased amplitude shift keying (DC-biased ASK) method is achieved. Here an information recording method applying the DC-biased ASK method is further provided for providing more options in information processing.

The present invention provides a signal generating apparatus for generating the information signal in foregoing information recording method. The signal generating apparatus includes a frequency oscillator, an address information encoder, and an addressing signal generator. The frequency oscillator generates a constant-frequency signal, and the address information encoder generates an address signal. The addressing signal generator synthesizes the constant-frequency signal and the address signal to generate the information signal, wherein the information signal includes the periodically undulated waveform and the non-periodically undulated waveform for indicating the information.

According to the information recording method applying the ASK method or the DC-biased ASK method, an information track having a periodically undulated section and a non-periodically undulated section is formed on an optical recording carrier for indicating an information. The information recording method may be embodied as an addressing method of an optical disk for recording address information of tracks of the optical disk. Compared to the conventional techniques, a continuous track structure is provided in the present invention to save the available recording space and improve the information reading precision of an optical recording carrier. A signal generating apparatus and a signal reading apparatus applied in the information recording method are also provided.

BRIEF DESCRIPTION OF THE DRAWINGS

The accompanying drawings are included to provide a further understanding of the invention, and are incorporated

DESCRIPTION OF THE EMBODIMENTS

Figure 1A:
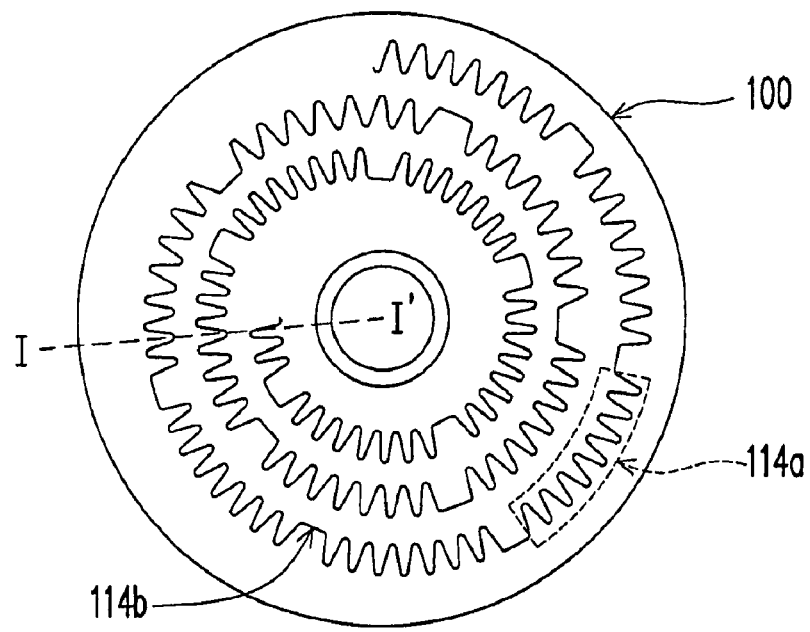
FIG. 1A is a top view of an optical disk according to an embodiment of the present invention.

Reference will now be made in detail to the present preferred embodiments of the invention, examples of which are illustrated in the accompanying drawings. Wherever possible, the same reference numbers are used in the drawings and the description to refer to the same or like parts.

The present invention provides an optical recording carrier for recording an information signal generated through amplitude shift keying (ASK), wherein the information signal has at least one periodically undulated waveform and at least one non-periodically undulated waveform for indicating the information recorded on the optical recording carrier (for example, the address information on an optical disk), and a clock signal or a synchronous signal required by system operation can be further obtained according to the information signal. Below, an optical disk will be taken as an example for explaining an information recording method provided by the present invention with reference to various embodiments, wherein how to embed an address information in the tracks on the optical disk will be explained and related apparatuses and method for generating and reading the address information will also be described.

However, following descriptions of embodiments of the present invention are only used for explaining the present invention but not for limiting the scope of the present invention. For example, the optical recording carrier in the present invention is not limited to an optical disk; instead, the optical recording carrier may also be other optical recording carriers having similar characteristics (for example, having similar information tracks), and the aforementioned information may also be other information besides the address information in the tracks of an optical disk. It should be understood by those of ordinary skill in the art that various changes in form and details may be made according to the present disclosure without departing from the spirit and scope of the present invention.

Figure 1B:
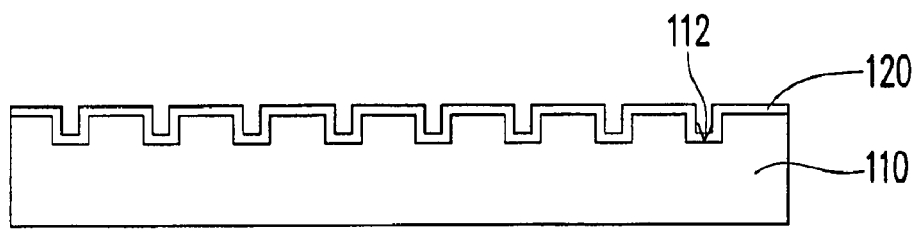
FIG. 1B is a cross-sectional view of the optical disk in FIG. 1A along line I-I'.

FIG. 1A is a top view of an optical disk according to an embodiment of the present invention, and FIG. 1B is a cross-sectional view of the optical disk in FIG. 1A along line I-I'. Referring to FIG. 1A and FIG. 1B, the optical disk 100 includes at least a substrate 110 and a data read/write medium 120. The substrate 110 has an information track 112 including one or multiple periodically undulated sections 114a and one or multiple non-periodically undulated sections 114b, wherein the numbers of the periodically undulated sections 114a and the non-periodically undulated sections 114b can be determined according to the actual design requirement and are not limited herein. Besides, the data read/write medium 120 is on the information track 112 and is used for recording information. In the present embodiment, the information track 112 is a helical track which winds outwardly from the centre of the optical disk. In another embodiment of the present invention, the information track 112 may also be a track of other types, such as a concentric track.

It should be noted that FIG. 1A and FIG. 1B only illustrate the schematic structures of various optical disks for the convenience of description. Generally speaking, an optical disk may further include an upper substrate, a passivation layer, a spacer, and other layers besides the aforementioned substrate (lower substrate) and the aforementioned data read/write medium according to the type of the optical disk. Besides, the data read/write medium is usually a stack layer composed of a recording material layer and a reflective material layer, and in the data read/write medium of a re-recordable optical disk, a dielectric layer may be further disposed at each side of the recording material layer in order to achieve a most precise shape of the burnt data point. The most common optical disks in today's market are single-layer record-once optical disk, single-layer re-recordable optical disk, double-layer record-once optical disk, and double-layer re-recordable optical disk etc. Below, the structures of these optical disks will be further described with reference to FIGS. 2A~2D. For the convenience of description, like reference numerals refer to like elements in FIGS. 2A~2D, and the repeated descriptions of like elements may be skipped. However, following embodiments are only described as examples but not for restricting the applications of the present invention, wherein the numbers and compositions of related layers may vary along the development of the fabrication processes thereof.

Figure 2A:
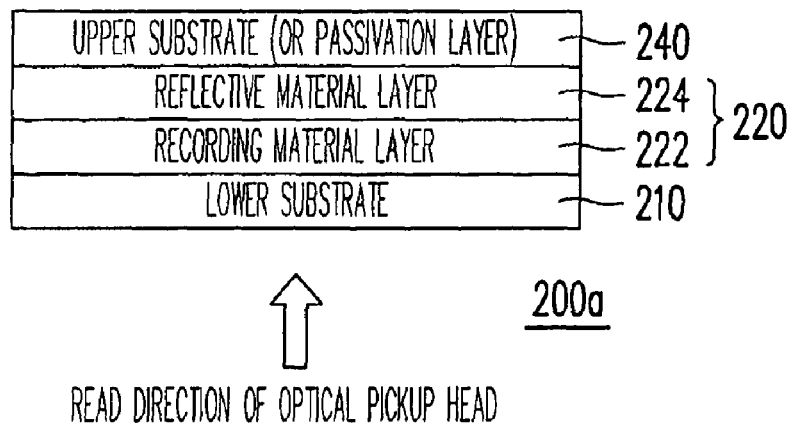
FIGS. 2A~2D respectively illustrate different optical disk structures according to embodiments of the present invention.

FIG. 2A is a cross-sectional view of a single-layer record-once optical disk. The single-layer record-once optical disk 200a includes sequentially a lower substrate 210, a data read/write medium 220, and an upper substrate (or a passivation layer) 240. As foregoing substrate 110, the lower substrate 210 also has an information track 112 (referring to FIG. 1A) for recording an address information, wherein the information track may be a land area or a groove (preferred to meet today's development trend) of the optical disk. A read beam emitted by an optical pickup head (not shown) can read the address information embedded in the information track through the lower substrate 210, or the data read/write medium 220 can be burnt by a high-power laser beam. In the present embodiment, the data read/write medium 220 includes a recording material layer 222 and a reflective material layer 224. Besides, the data read/write medium 220 is covered by the upper substrate 240 if the single-layer record-once optical disk 200 is a record-once DVD, wherein the upper substrate 240 is a planar substrate without any information track. On the other hand, if the single-layer record-once optical disk 200 is a record-once CD, the data read/write medium 220 is covered by the passivation layer 240 in order to protect the reflective material layer 224 and the recording material layer 222.

Figure 2B:
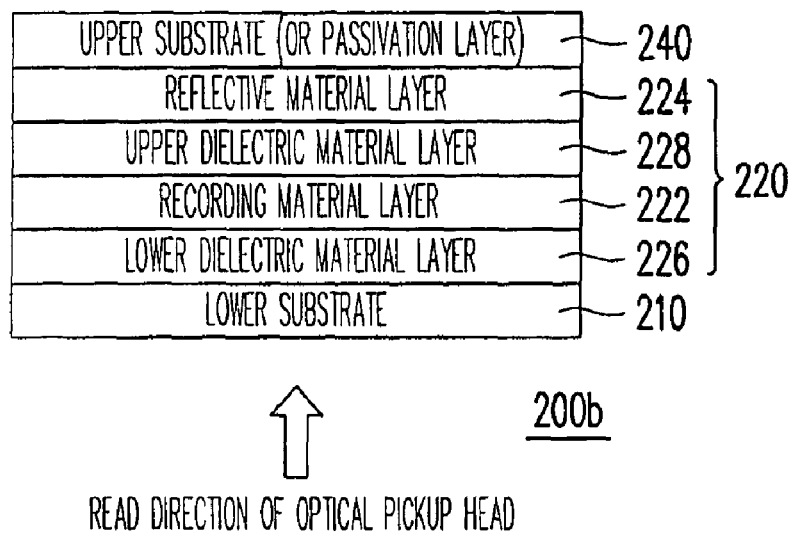

FIG. 2B is a cross-sectional view of a single-layer re-recordable optical disk. The data read/write medium 220 of the single-layer re-recordable optical disk 200b further includes a dielectric material layer 226 and a dielectric material layer 228 besides a recording material layer 222 and a reflective material layer 224, wherein the dielectric material layer 226 is located between the lower substrate 210 and the recording material layer 222, and the dielectric material layer 228 is located between the recording material layer 222 and the reflective material layer 224.

Figure 2C:
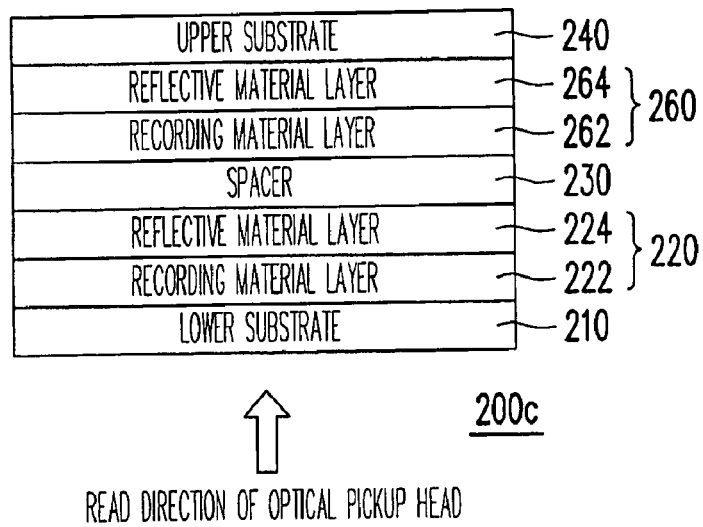

FIG. 2C is a cross-sectional view of a double-layer record-once DVD. The double-layer record-once DVD 200c includes sequentially a lower substrate 210, a data read/write medium 220, a spacer 230, a data read/write medium 260, and an upper substrate 240. The data read/write medium 220 includes a recording material layer 222 and a reflective material layer 224. The data read/write medium 260 includes a recording material layer 262 and a reflective material layer 264. Two common processes for double-layer recordable DVD are respectively "DVD9 attachment process" and "photo polymer process", wherein different upper substrates are adopted due to different fabrication processes. To be specific, the "DVD9 attachment process" is an earlier fabrication process, and the lower substrate 210 and the upper substrate 240 adopted both have special groove structures embedded with address information. In the "photo polymer process", the groove structures for recording address information are respectively located on the lower substrate 210 and the spacer 230, and the upper substrate 240 adopted in this process is a planar substrate without a groove structure. In the present embodiment, the groove structure for recording address information is the information track 112 illustrated in FIG. 1A, and which may also include one or multiple periodically undulated section and one or multiple non-periodically undulated section. In the present embodiment, the information track 112 may be a concentric track or a helical track.

Figure 2D:
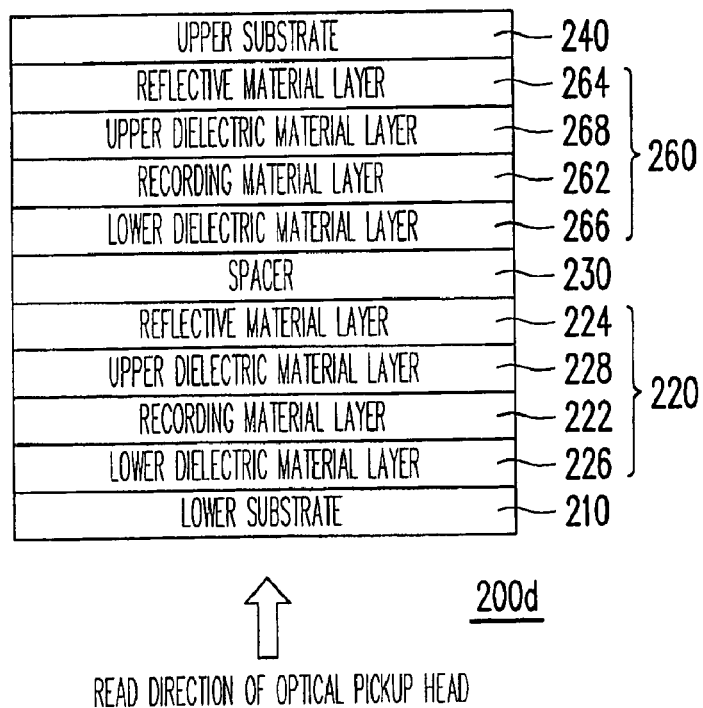

FIG. 2D is a cross-sectional view of a double-layer re-recordable DVD. The data read/write medium 220 of the double-layer re-recordable DVD 200d further includes a dielectric material layer 226 and a dielectric material layer 228 besides a recording material layer 222 and a reflective material layer 224, wherein the dielectric material layer 226 is located between the lower substrate 210 and the recording material layer 222, and the dielectric material layer 228 is located between the recording material layer 222 and the reflective material layer 224. Besides, the data read/write medium 260 further includes a dielectric material layer 266 and a dielectric material layer 268 besides a recording material layer 262 and a reflective material layer 264, wherein the dielectric material layer 266 is located between a spacer 230 and the recording material layer 262, and the dielectric material layer 268 is located between the recording material layer 262 and the reflective material layer 264.

In an optical disk player, the address information embedded in the information track is read by a read beam emitted by an optical pickup head. Thus, the information signal obtained while reading the information track is corresponding to the information track. Below, the ASK information recording method for an optical recording carrier provided by the present invention will be further described with reference to embodiments of the present invention. In order to simply the accompanying drawings and clearly describe the present invention, the information track on an optical disk will be indicated with a waveform thereof, and the detailed structure of the optical disk will not be illustrated.

Figure 3:
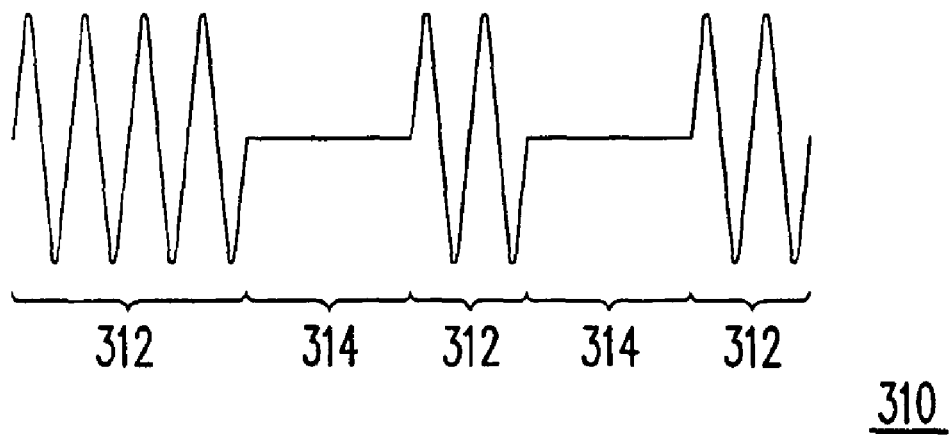
FIG. 3 illustrates an information track with amplitude shift keying (ASK) and a corresponding signal waveform according to an embodiment of the present invention.
Figure 3:
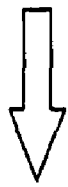
Figure 3:
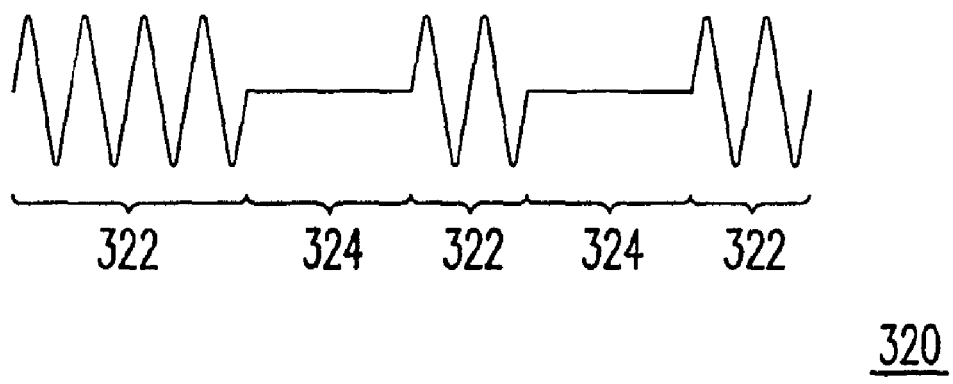

FIG. 3 illustrates an ASK information track and a corresponding signal waveform according to an embodiment of the present invention. In the present embodiment, the information track 310 includes a periodically undulated section 312 and a non-periodically undulated section 314. The information signal 320 obtained while reading the information track 310 also has a corresponding periodically undulated waveform 322 and a corresponding non-periodically undulated waveform 324 for respectively indicating different digital data. In the present embodiment, the periodically undulated waveform 322 and the non-periodically undulated waveform 324 respectively indicates digital data "1" and "0".

In the present embodiment, the digital data "1" is indicated by the periodically undulated section 312, wherein the waveform of the periodically undulated section 312 may be a sine wave or a cosine wave, and which can be expressed as $S(x)=A \sin(2\pi fx+\phi)$, wherein x is a position on the periodically undulated section 312, $S(x)$ is a shift at the position x along the radial direction of the optical disk, A is the undulation amplitude of the periodically undulated section 312, f is the undulation frequency of the periodically undulated section 312, and $\phi$ is an initial phase of the periodically undulated section 312. Accordingly, the periodically undulated waveform 322 in the information signal 320 can be expressed as $Y(t)=A' \sin(2\pi ft+\phi)$, wherein $Y(t)$ is the intensity, t is the time, A' is the amplitude, f is the frequency, and $\phi$ is the initial phase.

Besides, the digital data "0" is indicated by the non-periodically undulated section 320. The non-periodically undulated section may be a straight wave, and which can be expressed as $S(x)=C$, wherein C is a constant. In the present embodiment, $S(x)=C=0$, namely, the non-periodically undulated waveform 324 in the information signal 320 is a signal of zero level, which can be expressed as $Y(t)=0$.

Through the ASK information recording method described above, the address information can be embedded into the information track of the optical disk for respectively indicating digital data "1" and "0", and the optical pickup head can read a information signal containing the corresponding address information from the information track.

Figure 4:
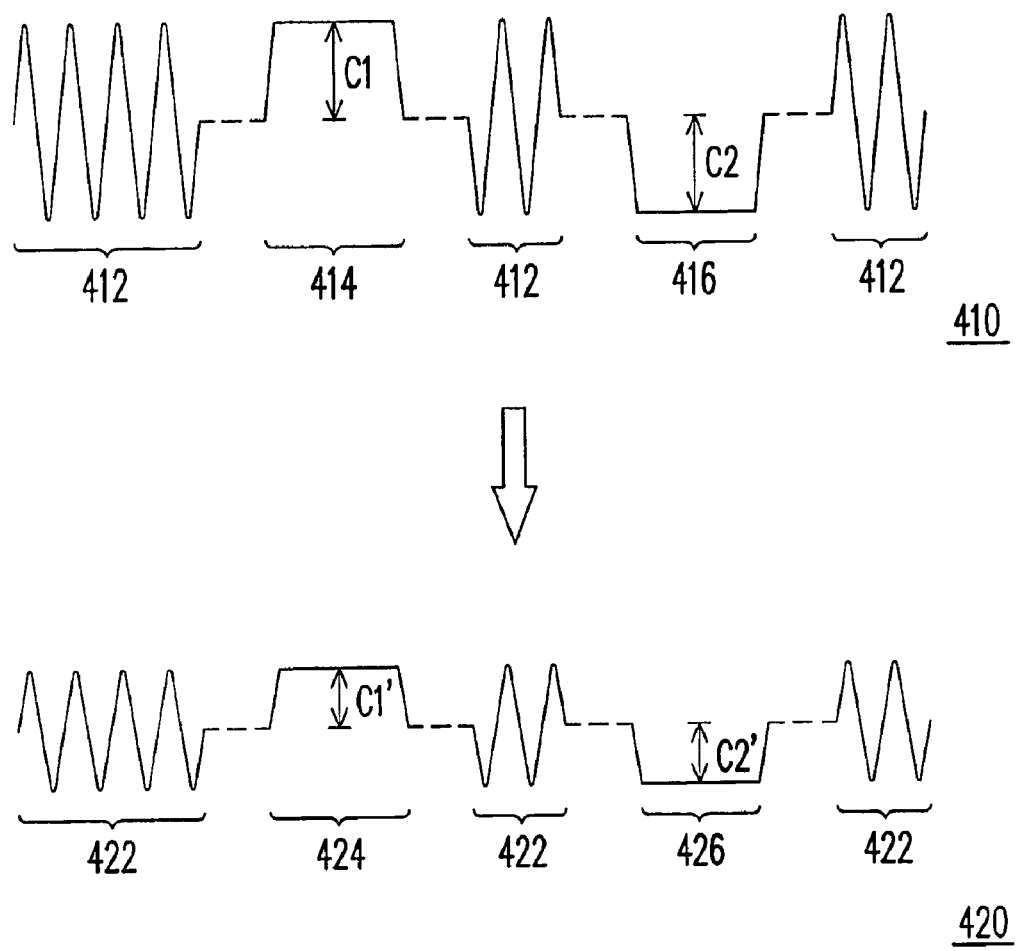
FIG. 4 illustrates an information track with DC-biased ASK and a corresponding signal waveform-according to an embodiment of the present invention.

FIG. 4 illustrates a DC-biased ASK information recording method according to another embodiment of the present invention, wherein a bias process is performed to a DC portion of the information signal in foregoing ASK information recording method, and a positive bias and a negative bias of the DC portion respectively indicate digital data "1" and "0". Besides, the periodically undulated section or waveform is used for indicating a third special information to be recorded. For example, the periodically undulated section or waveform can provide a constant clock signal in the addressing method of a recordable optical disk.

In the present embodiment, the non-periodically undulated section in the information track 410 includes a first sub-section and a second sub-section, namely, the first non-periodically undulated section 414 and the second non-periodically undulated section 416 in FIG. 4. The first non-periodically undulated section 414 can be expressed as S(x)=C1, and the second non-periodically undulated section 416 can be expressed as S(x)=C2, wherein x is a position on the non-periodically undulated section, S(x) is a shift at the position x in the radial direction of the optical disk, and C1 and C2 are two different constants. In other words, the first non-periodically undulated section 414 has a positive shift C1, and the second non-periodically undulated section 416 has a negative shift C2.

The information signal 420 obtained while reading the information track 410 through the optical pickup head includes a positively DC-biased first non-periodically undulated waveform 424 corresponding to the first non-periodically undulated section 414 for indicating digital data "1", wherein the first non-periodically undulated waveform 424 can be expressed as Y(t)=C1', Y(t) is the intensity, t is the time, and C1' is a constant. Besides, the information signal 420 further includes a negatively DC-biased second non-periodically undulated waveform 426 corresponding to the second non-periodically undulated section 416 for indicating digital data "0", wherein the second non-periodically undulated waveform 426 can be expressed as Y(t)=C2', C2' is a constant, and C1'≠C2'.

In addition, the waveform of the periodically undulated section 412 in the information track 410 may be a sine wave or a cosine wave, and which can be expressed as S(x)=A sin(2πfx+φ), wherein A is the undulation amplitude of the periodically undulated section 412, f is the undulation frequency of the periodically undulated section 412, and φ is an initial phase of the periodically undulated section 412. Accordingly, the periodically undulated waveform 422 in the information signal 420 can be expressed as d Y(t)=A' sin (2πft+φ), wherein A' is the amplitude, f is the frequency, and φ is the initial phase. The periodically undulated section 412 and the periodically undulated waveform 422 can provide a constant clock signal to be used in the addressing method of the recordable optical disk.

To further improve the identifiability of the information signal and the coding diversity, the periodically undulated section and the shifted non-periodically undulated section in foregoing embodiments may be composed to form a composite pattern for indicating a specific digital data, such as 0 or 1.

For example, if the waveform of the periodically undulated section is a sine wave and the waveform of the non-periodically undulated section is a straight wave, assuming that the length of each composite pattern is L, the starting point of the non-periodically undulated section on the composite pattern is X1, and the end point thereof is X2, the composite pattern can be expressed as:

$S(x)=A \sin(2\pi fx+\phi)$ when $0 \leq x \leq X1$ and $X2 \leq x < L$;

$S(x)=C$ when $X1 \leq x \leq X2$, wherein x is a position on the composite pattern, S(x) is a shift at the position x along the radial direction of the optical disk, A is the undulation amplitude of the periodically undulated section, f is the undulation frequency of the periodically undulated section, φ is an initial phase of the periodically undulated section, L is the length of the composite pattern, X1 is the starting point of the non-periodically undulated section on the composite pattern, X2 is the end point of the non-periodically undulated section on the composite pattern, and C is a constant.

Correspondingly, the information signal obtained by reading the information track through the optical pickup head also has a composite waveform composed of the periodically undulated waveform and the non-periodically undulated waveform. The composite waveform can be expressed as:

$Y(t)=A' \sin(2\pi ft+\phi)$ when $0 \leq t \leq T1$ and $T2 \leq t < T$;

$Y(t)=C$ when $T1 \leq t \leq T2$, wherein Y(t) is the intensity, t is the time, A' is the amplitude, f is the frequency, φ is an initial phase, T is the period of the composite waveform, T1 is the starting point of the non-periodically undulated waveform in the composite waveform, T2 is the end point of the non-periodically undulated waveform in the composite waveform, and C is a constant.

Figure 5A:
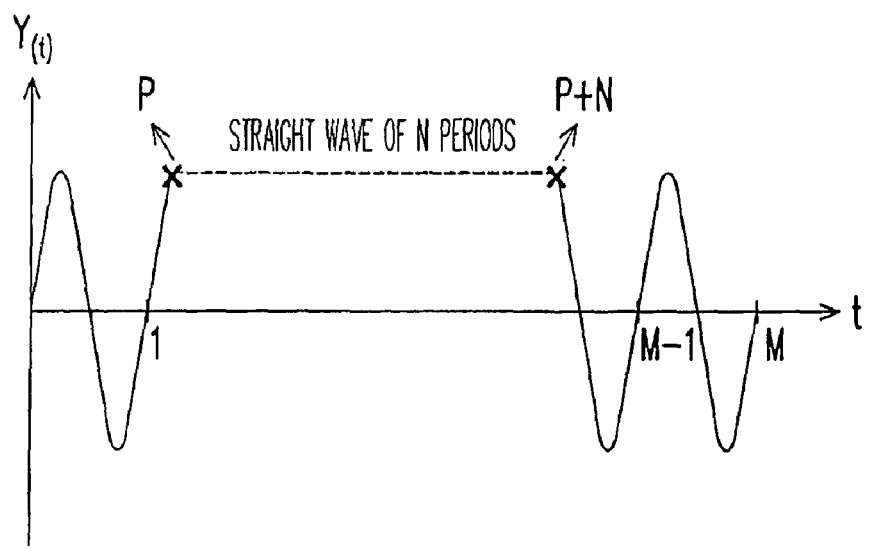
FIGS. 5A~5C respectively illustrate composite units of periodically undulated waveforms and shifted non-periodically undulated waveforms in unit of multiple periods according to embodiments of the present invention.
Figure 5B:
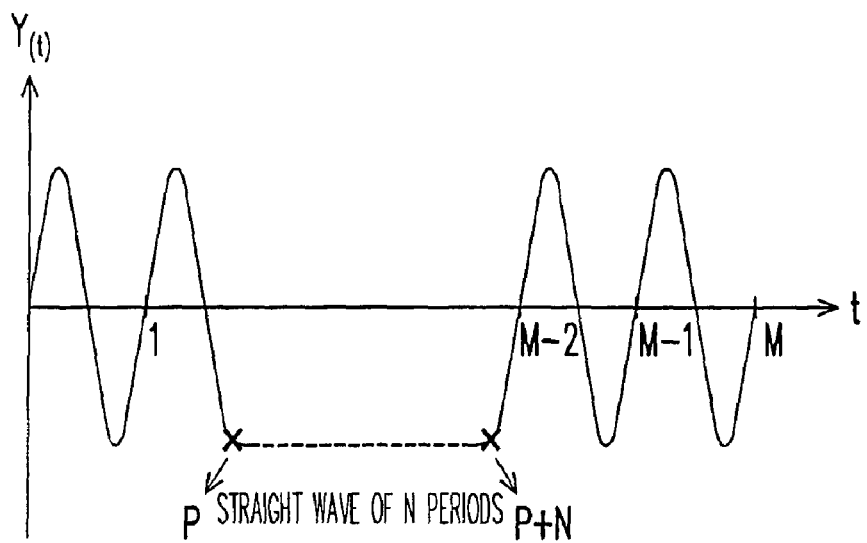
Figure 5C:
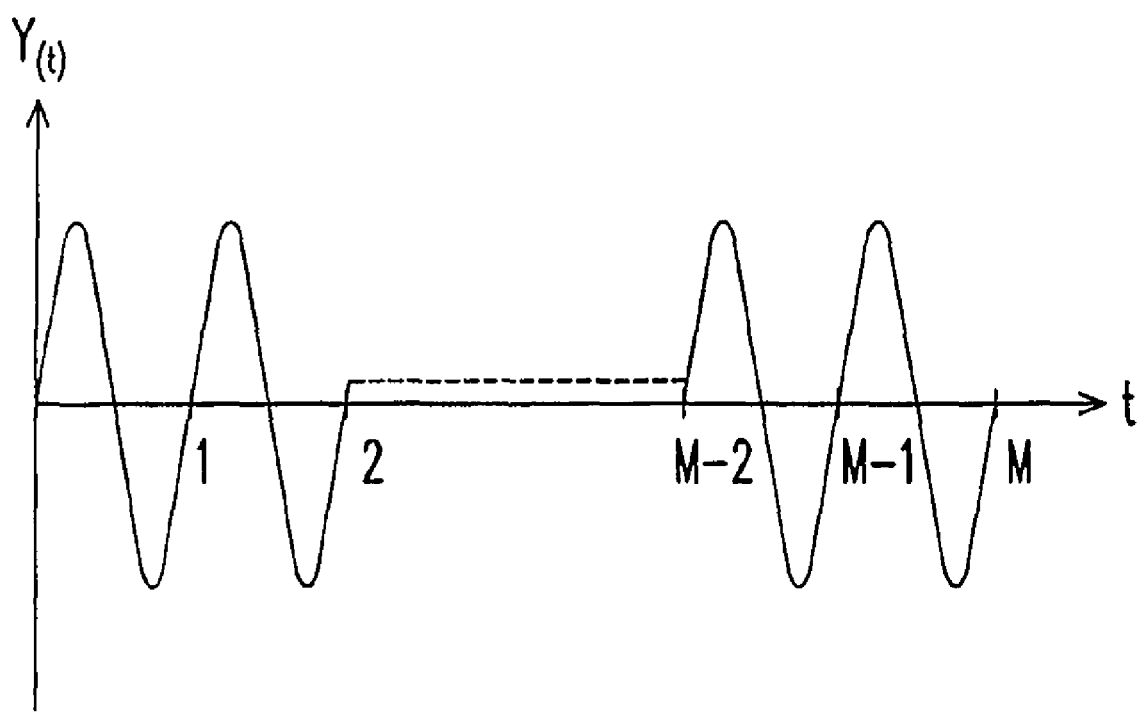

In an embodiment of the present invention, preferably, the periodically undulated waveform and the shifted non-periodically undulated waveform may be further composed in unit of multiple periods in order to form the information track or the information signal. For the convenience of description, the information signal or the information track will be indicated with only a signal waveform in time domain, and it should be understood by those skilled in the art that the actual waveform of the information track is corresponding to the information signal read from the information track therefore the two waveforms have the same characteristics. For example, each composite unit has a length of at least two periods, and each composite unit has a periodically undulated waveform (such as a sine wave or a cosine wave) of at least one period and a non-periodically undulated waveform of at least one period, wherein the non-periodically undulated waveform has a shift so that digital data "1" or "0" can be identified through the direction (positive or negative) of the shift. If the waveform of the periodically undulated section is a sine wave and the waveform of the non-periodically undulated section is a straight wave, assuming that each composite unit has a length of M periods (M is a natural number greater than or equal to 2) and the straight wave in the composite unit has a length of N periods (N is a natural number and $1 \leq N < M$), then the periodically undulated waveform in the composite unit has a length of (M−N) periods; in addition, assuming P is the starting point of the straight wave, then as shown in FIG. 5A, the composite unit for indicating the digital data "1" meets following conditions:

$$I \cdot \frac{1}{2f} < P < (I+1) \cdot \frac{1}{2f},$$

wherein $0 \leq I < 2*(M-N)$, and I is an even integer;

in addition, as shown in FIG. 5B, the composite unit for indicating the digital data "0" meets following conditions:

$$I \cdot \frac{1}{2f} < P < (I+1) \cdot \frac{1}{2f},$$

wherein $0 \leq I < 2*(M-N)$, and I is an odd integer;

in addition, as shown in FIG. 5C, the periodically undulated waveform for indicating a third information (such as a clock signal) meets following conditions:

$Y(t)=A' \sin(2\pi ft+\phi)$;

wherein Y(t) is the intensity, t is the time, A' is the amplitude, f is the frequency, φ is an initial phase, and $0 \leq t \leq M$.

Figure 6:
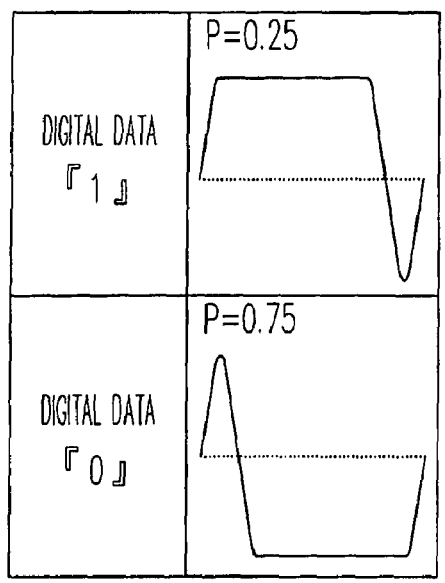
FIG. 6 illustrates digital value "1" or "0" indicated by a composite unit of two periods according to an embodiment of the present invention.

If the composite unit has the smallest waveform (i.e. M=2, N=1), the composite units for indicating the digital data "1" and "0" are respectively indicated by only one waveform, as shown in FIG. 6.

Figure 7:
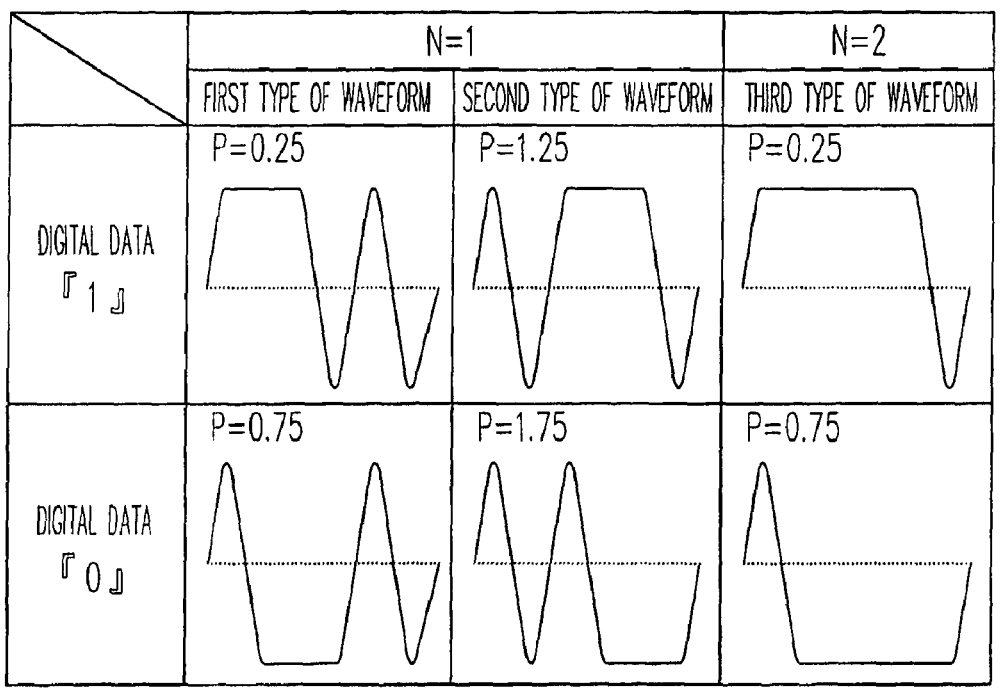
FIG. 7 illustrates digital value "1" or "0" indicated by a composite unit of three periods according to an embodiment of the present invention.

Additionally, if the waveform of the composite unit has a length of three periods (i.e. M=3), the composite units for indicating the digital data "1" and "0" can be respectively indicated by three waveforms, as shown in FIG. 7.

In other words, the more periods a composite unit covers, the more waveforms are available. In foregoing embodiments, the composite unit respectively having a length of two periods and three periods is described only as example but not for restricting the length of the composite unit in the present invention, and those skilled in the art should be able to select a suitable length of the composite unit and a suitable waveform for indicating specific information according to the actual requirement.

On the other hand, when foregoing "DC-biased ASK" information recording method is applied to the addressing technique of an optical recording carrier and the waveform of only one composite unit is used for indicating digital data (for example, M=3, N=1, first waveform in FIG. 7), incorrect data reading may be caused due to surface scratch or circuit problem on the optical recording carrier. Thus, to read the embedded data correctly from the optical recording carrier, multiple composite units can be further composed in order to form some specific patterns for indicating digital data.

Figures 8, 9A:
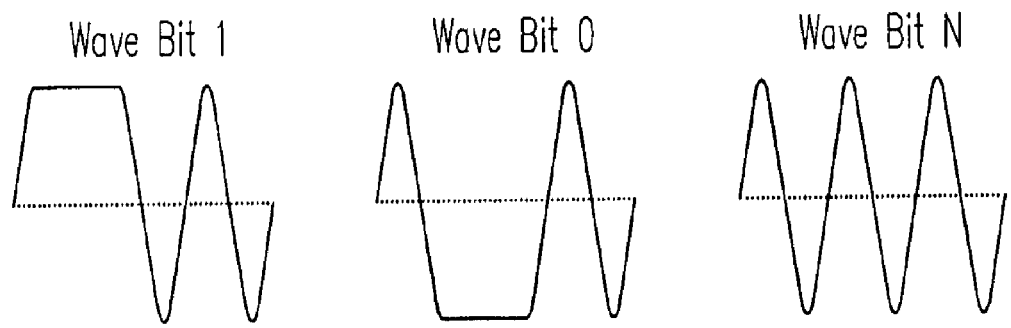
FIG. 8 illustrates different wave bits respectively defined by a composite unit of three periods.
FIG. 9A is a table showing digital data "0", "1", and other information indicated with compositions of the wave bits in FIG. 8 according to an embodiment of the present invention.
Figure 9B:
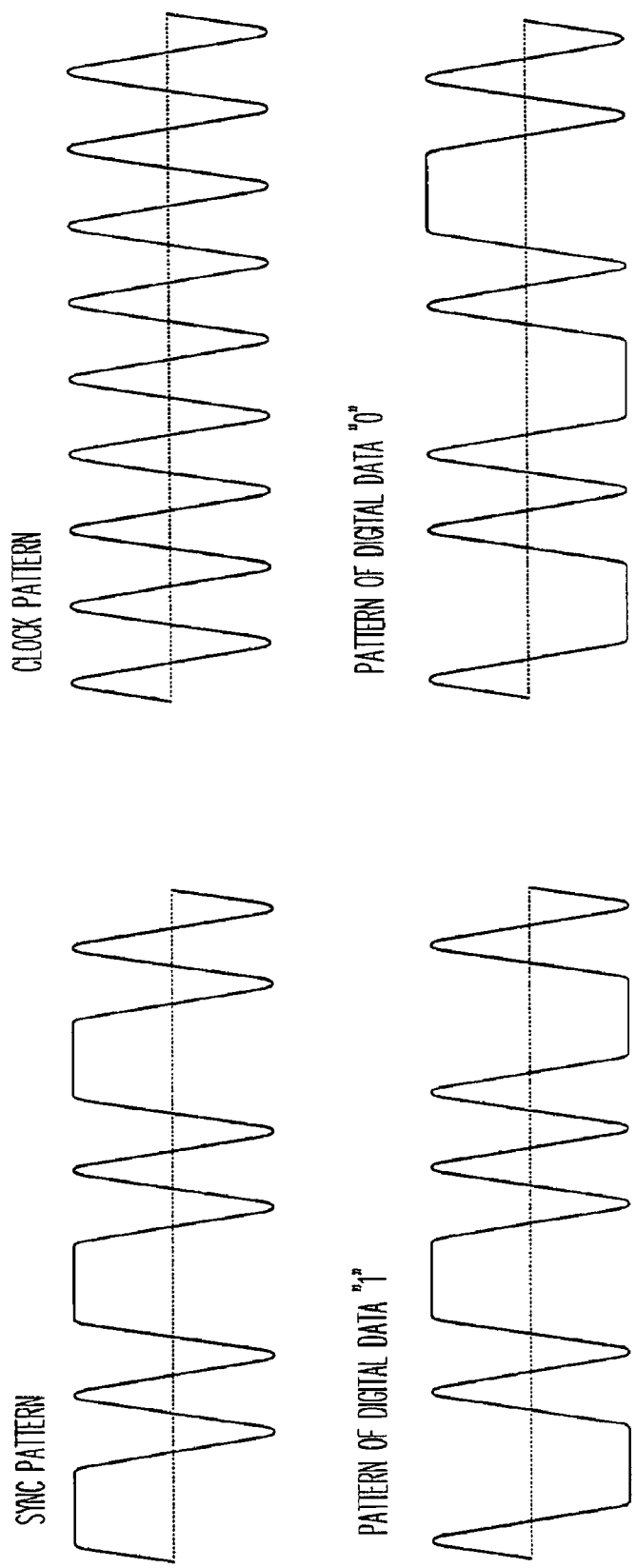
FIG. 9B illustrates waveforms of the compositions of the wave bits in FIG. 9A.

As shown in FIG. 8, taking M=3, N=1, and the first waveform in FIG. 7 as example, three types of wave bits are defined in the present embodiment and which are respectively wave bit "1", wave bit "0", and wave bit "N". Next, as shown in the table in FIG. 9A, some specific patterns are formed by using the three wave bits for respectively indicating digital data "0", "1", and some special information such as a synchronous signal or a clock signal etc. In the present embodiment, the specific patterns include: a SYNC pattern, which is composed of three continuous wave bits 1; digital data "1", which is composed of wave bit 0, wave bit 1, and wave bit 0 in order; digital data "0", which is composed of wave bit 0, wave bit 0, and wave bit 1 in order; and a clock pattern, which is composed of three continuous wave bits N and used for areas wherein no address or identification information is pre-recorded. As shown in FIG. 9B, foregoing four patterns can be used for indicating specific information so as to form a continuous information track.

As described above, specific information (for example, address information) can be embedded into or read from the information track of an optical recording carrier through foregoing "ASK" or "DC-biased ASK" information recording method. To be specific, according to the information recording method, first, an information signal containing specific information is generated by a signal generating apparatus, and the information signal is embedded in the information track of an optical recording carrier during a fabrication process of the optical recording carrier. After that, the information track is read by an information reading apparatus in order to restore the specific information embedded in the information track.

Figure 10:
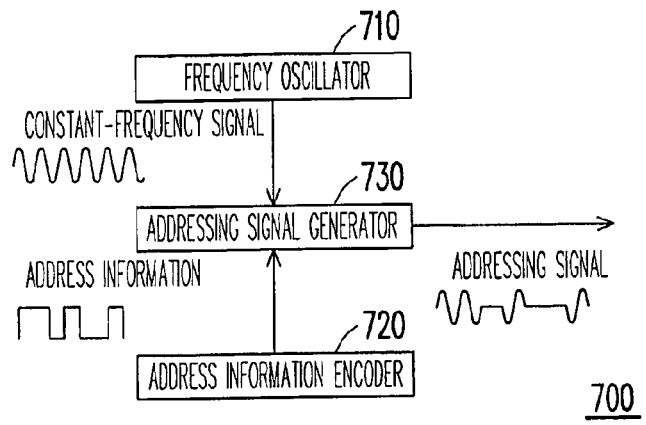
FIG. 10 illustrates a signal generating apparatus according to an embodiment of the present invention.

FIG. 10 illustrates a signal generating apparatus according to an embodiment of the present invention. The signal generating apparatus is adaptable to the information recording method provided by the present invention for generating the information signal. As shown in FIG. 10, the generation of an addressing signal for an optical disk is explained in the present embodiment, wherein the signal generating apparatus 700 includes a frequency oscillator 710, an address information encoder 720, and an addressing signal generator 730. The frequency oscillator 710 generates a constant-frequency signal. The address information encoder 720 generates an address signal. The addressing signal generator 730 composes the constant-frequency signal and the address signal to generate the addressing signal. As described in foregoing embodiments, the addressing signal includes at least one periodically undulated waveform and at least one non-periodically undulated waveform for indicating specific information.

To be specific, in the present embodiment, the frequency oscillator 710 in the signal generating apparatus 700 generates a periodically undulated waveform signal having a constant frequency (i.e. the constant-frequency signal), and the address information encoder 720 in the signal generating apparatus 700 generates a digital signal of an address information (i.e. the address signal) and respectively inputs the two signals into the addressing signal generator 730. Taking the "ASK" information recording method illustrated in FIG. 3 as example, when the digital signal is at high level (the digital data "1"), the addressing signal generator 730 outputs a periodically undulated waveform signal, and when the digital signal is at low level (the digital data "0"), the addressing signal generator 730 outputs a DC signal, wherein the DC signal is at the median level of the periodically undulated waveform signal, for example, the zero level. Accordingly, an addressing signal is obtained and input into a laser mask writing system (not shown). The laser mask writing system then writes the addressing signal into the information track (for example, a groove structure) of the optical recording carrier. A recordable optical disk embedded with the addressing information in the information groove thereof is obtained through a mastering process and a disk fabrication process.

Taking the "DC-biased ASK" information recording method illustrated in FIG. 4 as example, when the digital signal is at high level (digital data "1"), the addressing signal generator 730 outputs a waveform signal having digital data "1", as shown in FIG. 9B, and when the digital signal is at low level (digital data "0"), the addressing signal generator 730 outputs a waveform signal having digital data "0", as shown in FIG. 9B. Accordingly, an addressing signal is obtained and input into a laser mask writing system. The laser mask writing system (not shown) writes the addressing signal into the information track (for example, a groove structure) of the optical recording carrier. A recordable optical disk embedded with the addressing information in the information groove thereof can also be obtained through a mastering process and a disk fabrication process.

In other words, the signal generating apparatus 700 can be applied to the information recording methods in various embodiments described above, such as the "ASK" information recording method illustrated in FIG. 3 and the "DC-biased ASK" information recording method illustrated in FIG. 4. Besides, the signal generating apparatus 700 may further generate the composite waveforms illustrated in FIGS. 5A~5C, FIG. 6, and FIG. 7 or the specific patterns composed of composite waveforms for indicating specific information as illustrated in FIG. 9. Thereafter, similarly, the addressing signal can be written into the information track (for example, a groove structure) of an optical recording carrier by a laser mask writing system, and a recordable optical disk embedded with the addressing information can be obtained through a mastering process and a disk fabrication process.

Additionally, in the present embodiment, the addressing signal generated by the signal generating apparatus 700 may also be expressed as the waveform formulae in embodiments described above, and which will not be described herein.

Figure 11:
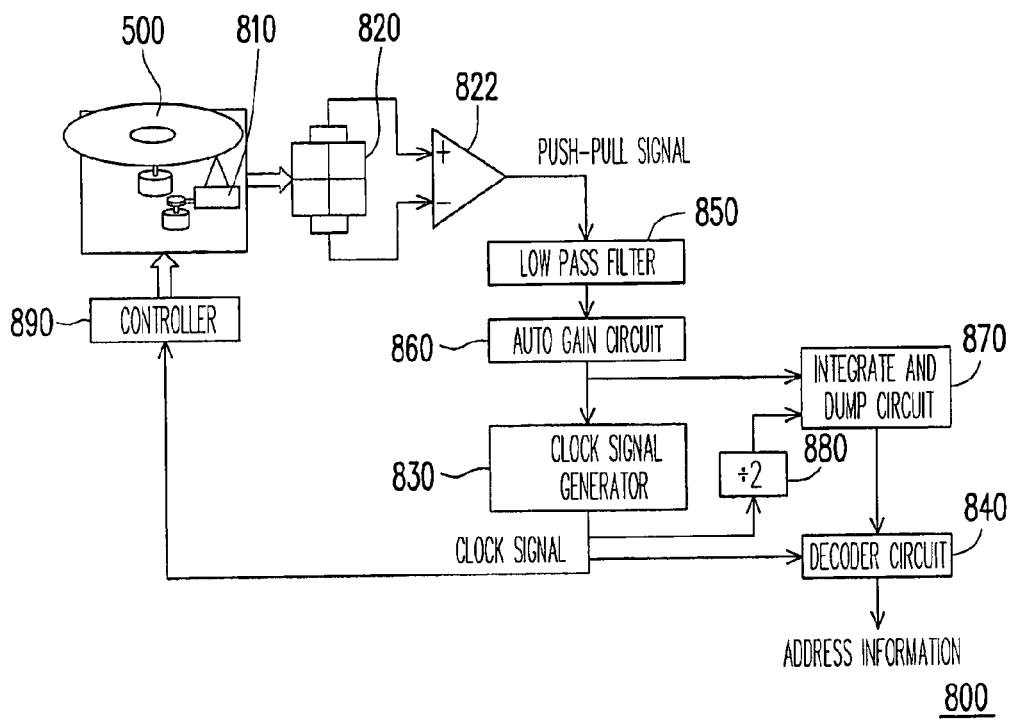
FIG. 11 illustrates an information reading apparatus according to an embodiment of the present invention.

Various information reading apparatuses for reading the information track on an optical recording carrier in order to restore the specific information embedded in the information track will be described below. FIG. 11 illustrates an information reading apparatus 800 according to an embodiment of the present invention. Referring to FIG. 11, the information reading apparatus 800 includes an optical pickup head 810, a photo detector 820, a clock signal generator 830, and a decoder circuit 840. The optical pickup head 810 emits a read beam on the information track of an optical recording carrier 500. The photo detector 820 receives the reflective beam from the information track so as to obtain a push-pull signal, wherein the push-pull signal includes at least one periodically undulated waveform and at least one non-periodically undulated waveform for respectively corresponding to the periodically undulated section and the non-periodically undulated section described in foregoing embodiments on the information track. The clock signal generator 830 generates a clock signal according to the push-pull signal. The decoder circuit 840 decodes the push-pull signal according to the clock signal so as to obtain the information embedded in the information track.

In the present embodiment, the optical recording carrier 500 may be an optical disk, and the read beam generated by the optical pickup head 810 may be laser beam. In addition, the photo detector 820 may be a quad photo detector, and the clock signal generator 830 includes a phase lock loop (PLL) circuit. Moreover, the information reading apparatus 800 may further include a controller 890, wherein the controller 890 receives various control signals, such as the clock signal, a convergence feedback signal, and a tracking feedback signal etc, for controlling the read operation of the optical pickup head 810.

In order to increase signal identifiability, the information reading apparatus 800 may further include a filter 850 (for example, a low pass filter) which receives the push-pull signal generated by the photo detector 820, filters out the noises in the push-pull signal, and then outputs the push-pull signal to the clock signal generator 830 and the decoder circuit 840. Besides, the information reading apparatus 800 may further include an auto gain controller 860 for receiving the push-pull signal from the filter 850, increases the amplitude of the push-pull signal, and outputs the push-pull signal to the clock signal generator 830 and the decoder circuit 840.

Referring to FIG. 11, the information reading apparatus 800 may further include an integrate and dump circuit 870 disposed between the photo detector 820 and the decoder circuit 840 for detecting the non-periodically undulated waveform in the push-pull signal. Besides, the information reading apparatus 800 may further include a frequency divider circuit 880 which receives the clock signal and divides the frequency of the clock signal. The integrate and dump circuit 870 receives the push-pull signal and the clock signal output by the frequency divider circuit 880 and performs an integrate and dump process to the push-pull signal according to the clock signal. After that, the integrate and dump circuit 870 outputs a treated signal to the decoder circuit 840.

Foregoing components are all illustrated in FIG. 11 for the convenience of description. However, actually components in the information reading apparatus 800 may vary along with different application requirement. Those skilled in the art should be able to change the components of the information reading apparatus 800 in order to optimize the actual application of the present invention without departing the scope and spirit of the present invention. The detailed process of the information reading apparatus 800 reading and decoding the information signal will be described below with reference to an embodiment of the present invention.

FIGS. 12A~12D illustrate related signal waveforms obtained by reading and decoding the "DC-biased ASK" addressing groove structure by the information reading apparatus 800 in FIG. 11 according to an embodiment of the present invention.

Figure 12A:
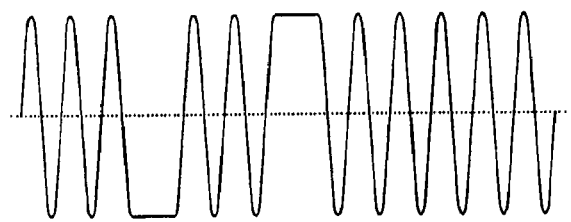
FIGS. 12A~12D illustrate waveforms of related signals obtained by reading and decoding the "DC-biased ASK" addressing groove structure by the information reading apparatus in FIG. 11.

First, an optical pickup head 810 focuses a laser beam on the groove structure of an optical disk 500 and moves the focus point along the direction of the grooves. The reflected beam returns to the optical pickup head 810 and is radiated on the quad photo detector 820 so that the optical signal is converted into an electric signal. The electric signal is processed by an amplifier 822 to obtain a push-pull signal, wherein the push-pull signal truly reflects the "DC-biased ASK" addressing groove structure on the optical disk 500. Selectively, high-frequency noises in the push-pull signal can be filtered out by the low pass filter 850, and an optimal push-pull signal as illustrated in FIG. 12A is obtained after the push-pull signal is further processed by the auto gain controller 860.

Figure 12B:
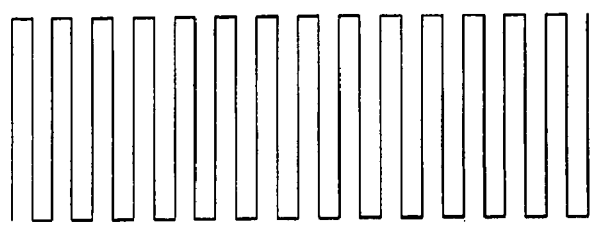

After that, the push-pull signal is input into the clock signal generator 830 (for example, the PLL circuit) and is processed by the clock signal generator 830 to obtain the clock signal as illustrated in FIG. 12B which has the same frequency as the push-pull signal, wherein the frequency of the clock signal is assumed to be f.

Figure 12C:
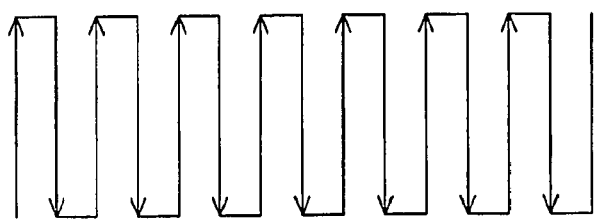

Next, the clock signal having frequency f is input to the controller 890 (for example, a spindle controller) so that the rotation speed of the spindle can be controlled according to the clock signal. Besides, the clock signal is input to the frequency divider circuit 880 to obtain another clock signal as illustrated in FIG. 12C which has a frequency 0.5 f.

Figure 12D:
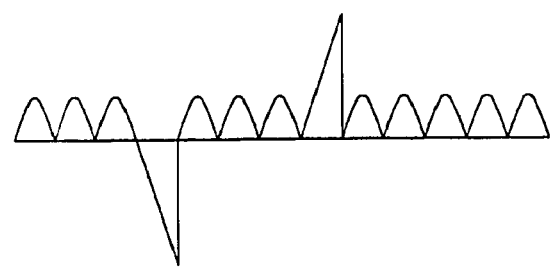

Thereafter, the clock signal having frequency 0.5 f is input to the integrate and dump circuit 870. The integrate and dump circuit 870 performs a "integrate" and "dump (signal zeroing)" process to the push-pull signal at rising edges and falling edges of the clock signal having frequency 0.5 f so as to obtain the signal as illustrated in FIG. 12D. After that, the signal illustrated in FIG. 12D is input to the decoder circuit 840, and the decoder circuit 840 decodes the signal to obtain the address information in the groove structure of the optical disk 500.

Figure 13:
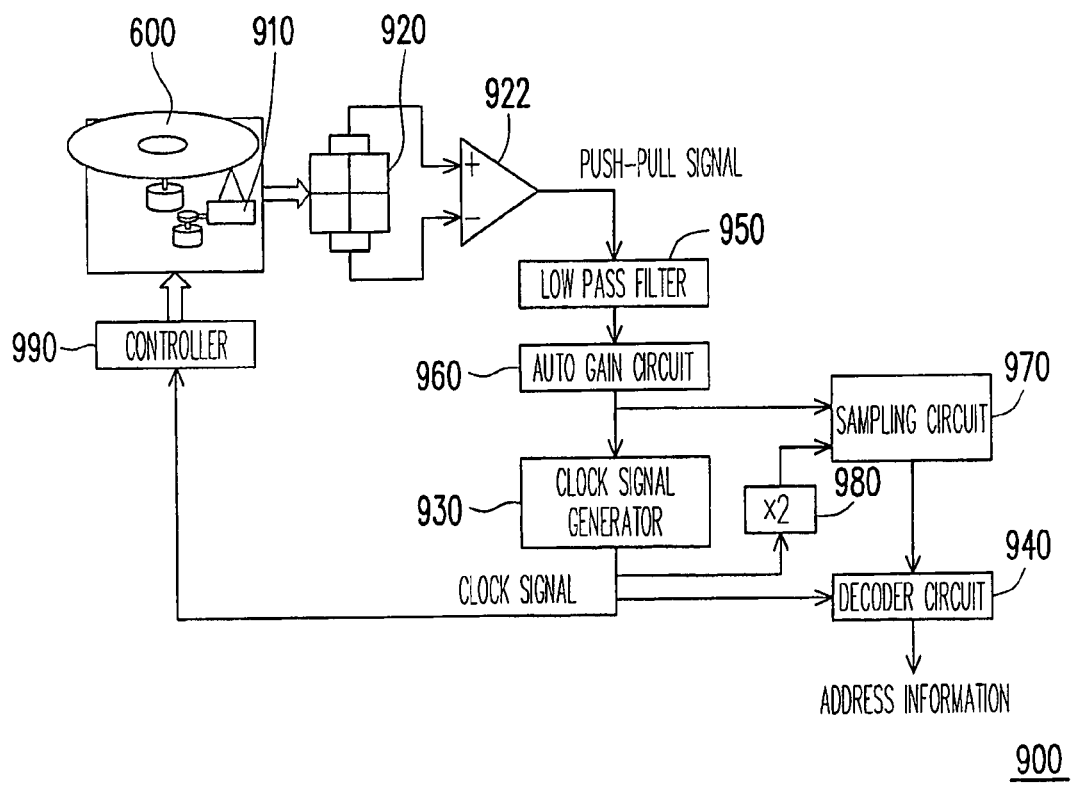
FIG. 13 illustrates an information reading apparatus according to an embodiment of the present invention.

FIG. 13 illustrates an information reading apparatus 900 according to an embodiment of the present invention. Referring to FIG. 13, the information reading apparatus 900 includes an optical pickup head 910, a photo detector 920, a clock signal generator 930, and a decoder circuit 940. The optical pickup head 910 emits a read beam on the information track of the optical recording carrier 600. The photo detector 920 receives the reflected beam from the information track so as to obtain a push-pull signal, wherein the push-pull signal includes at least one periodically undulated waveform and at least one non-periodically undulated waveform for respectively indicating the periodically undulated section and the non-periodically undulated section on the information track. The clock signal generator 930 generates a clock signal according to the push-pull signal. The decoder circuit 940 decodes the push-pull signal according to the clock signal to obtain the information embedded in the information track.

In the present embodiment, the optical recording carrier 600 may be an optical disk, and the read beam generated by the optical pickup head 910 may be a laser beam. Besides, the photo detector 920 may be a quad photo detector, and the clock signal generator 930 includes a PLL circuit. Additionally, the information reading apparatus 900 may further include a controller 990 which receives various control signals, such as the clock signal, a convergence feedback signal, and a tracking feedback signal etc, for controlling the read operation of the optical pickup head 910.

In order to increase signal identifiability, the information reading apparatus 900 may further include a filter 950 (for example, a low pass filter) which receives the push-pull signal generated by the photo detector 920, filters out noises in the push-pull signal, and then outputs the push-pull signal to the clock signal generator 930 and the decoder circuit 940. In addition, the information reading apparatus 900 may further include an auto gain controller 960 which receives the push-pull signal from the filter 950, increases the amplitude of the push-pull signal, and then outputs the push-pull signal to the clock signal generator 930 and the decoder circuit 940.

Unlike the embodiments described above, in the present embodiment, the information reading apparatus 900 may include a sampling circuit 970 disposed between the photo detector 920 and the decoder circuit 940 for detecting the non-periodically undulated waveform in the push-pull signal. Besides, the information reading apparatus 900 may further include a frequency multiplier circuit 980 for receiving the clock signal and multiplies the frequency of the clock signal. The sampling circuit 970 receives the push-pull signal and the clock signal output by the frequency multiplier circuit 980 and samples the push-pull signal according to the clock signal. After that, the sampling circuit 970 then outputs a treated signal to the decoder circuit 940.

For the convenience of description, all the components in the information reading apparatus 900 are illustrated in FIG. 13. However, actually, components in the information reading apparatus 900 may vary along different application requirement. Those skilled in the art should be able to change the components in the information reading apparatus 900 in order to optimize the actual application of the present invention without departing the scope and spirit of the present invention. The detailed process of the information reading apparatus 900 reading and decoding the information signal will be described below with reference to an embodiment of the present invention.

FIGS. 14A~14D illustrate related signal waveforms obtained by reading and decoding the "DC-biased ASK" addressing groove structure by the information reading apparatus 900 in FIG. 13 according to an embodiment of the present invention.

Figure 14A:
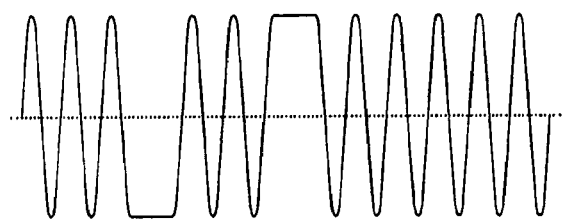
FIGS. 14A~14D illustrate waveforms of related signals obtained by reading and decoding the "DC-biased ASK" addressing groove structure by the information reading apparatus in FIG. 13.

First, an optical pickup head 910 emits a laser beam on the groove structure of an optical disk 600 and moves the focus point along the direction of the grooves. The reflected beams returns to the optical pickup head 910 and is radiated on the quad photo detector 920 so that the optical signal is converted into an electric signal. The electric signal is amplified by an amplifier 922 to obtain a push-pull signal, wherein the push-pull signal truly reflects the "DC-biased ASK" addressing groove structure on the optical disk 600. Selectively, high-frequency noises in the push-pull signal can be filtered out by the low pass filter 950, and an optimal push-pull signal as illustrated in FIG. 14A is obtained after the push-pull signal is further processed by the auto gain controller 960.

Figure 14B:
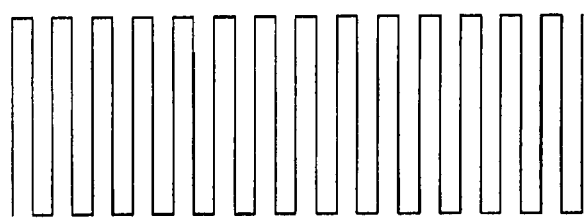

After that, the push-pull signal is input into the clock signal generator 930 (for example, the PLL circuit) and is processed by the clock signal generator 930 to obtain the clock signal as illustrated in FIG. 14B which has the same frequency as the push-pull signal, wherein the frequency of the clock signal is assumed to be f.

Figure 14C:
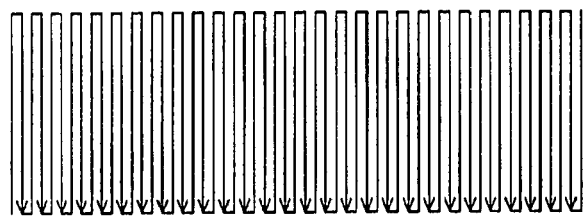

Next, the clock signal having frequency f is input to the controller 990 (for example, a spindle controller) so that the rotation speed of the spindle can be controlled according to the clock signal. Besides, the clock signal is input to the frequency multiplier circuit 980 to obtain another clock signal as illustrated in FIG. 14C which has a frequency 2 f.

Figure 14D:
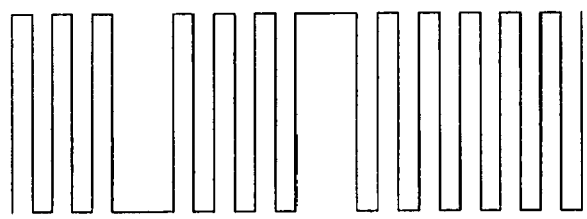

Thereafter, the clock signal having frequency 2 f is input to the sampling circuit 970, and the sampling circuit 970 samples the push-pull signal at falling edges of the clock signal having frequency 2 f. When the sampling signal has a positive voltage level, the sampling circuit 970 outputs a high-level signal, and when the sampling signal has a negative voltage level, the sampling circuit 970 outputs a low-level signal, and accordingly the signal as illustrated in FIG. 14D is obtained. After that, the signal illustrated in FIG. 14D is input to the decoder circuit 940 to obtain the address information in the groove structure of the optical disk 600.

In overview, the present invention provides an optical recording carrier having continuous tracks and an ASK information recording method adaptable to the optical recording carrier. The present invention further provides a DC-biased ASK information recording method wherein a information track having a periodically undulated section and a non-periodically undulated section is formed on an optical recording carrier for indicating specific information, such as the address information of the optical recording carrier. Unlike conventional information recording methods, the information recording method in the present invention provides a continuous track structure on the optical recording carrier to save the available recording space and improve the information reading precision of the optical recording carrier. Moreover, a signal generating apparatus for generating the specific information and an information reading apparatus for reading the specific information embedded in the optical recording carrier are also provided.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. An optical recording carrier, comprising:
   a first substrate, having a information track, wherein the information track comprises at least one periodically undulated section and at least one non-periodically undulated section, the non-periodically undulated section in the information track of the first substrate comprises a first sub-section and a second sub-section, the first sub-section is expressed as $S(x)=C1$, the second sub-section is expressed as $S(x)=C2$, x is a position on the non-periodically undulated section, $S(x)$ is a shift at the position x, and C1 and C2 are two different constants; and
   a data read/write medium, located on the information track.

2. The optical recording carrier according to claim 1, wherein the information track of the first substrate is a concentric track or a helical track.

3. The optical recording carrier according to claim 1, wherein the periodically undulated section in the information track of the first substrate is expressed as:

$$S(x)=A\sin(2\pi fx+\phi)$$

x is a position on the periodically undulated section, $S(x)$ is a shift at the position x, A is an undulation amplitude of the periodically undulated section, f is an undulation frequency of the periodically undulated section, and $\phi$ is an initial phase of the periodically undulated section.

4. The optical recording carrier according to claim 1, wherein the data read/write medium comprises a recording material layer and a reflective material layer, wherein the recording material layer is located between the reflective material layer and the first substrate.

5. The optical recording carrier according to claim 4, wherein the data read/write medium further comprises a first dielectric material layer and a second dielectric material layer, wherein the first dielectric material layer is located between the first substrate and the recording material layer, and the second dielectric material layer is located between the recording material layer and the reflective material layer.

6. The optical recording carrier according to claim 1, wherein the data read/write medium comprises a plurality of stack layers and at least one spacer, wherein the spacer is located between two adjacent stack layers, each stack layer comprises a recording material layer and a reflective material layer, and the recording material layer is located between the reflective material layer and the first substrate, or between the reflective material layer and the spacer.

7. The optical recording carrier according to claim 6, wherein each stack layer in the data read/write medium further comprises a first dielectric material layer and a second dielectric material layer, wherein the first dielectric material layer is located between the first substrate and the corresponding recording material layer or between the spacer and the corresponding recording material layer, and the second dielectric material layer is located between the corresponding recording material layer and the corresponding reflective material layer.

8. The optical recording carrier according to claim 1 further comprising a second substrate or a passivation layer disposed on the data read/write medium.

9. The optical recording carrier according to claim 8, wherein the second substrate is a planar substrate.

10. The optical recording carrier according to claim 8, wherein the second substrate has another information track, and the information track of the second substrate comprises at least another one periodically undulated section and at least another one non-periodically undulated section, wherein the non-periodically undulated section in the information track of the second substrate is expressed as $S(x)=C$, x is a position on the non-periodically undulated section, $S(x)$ is a shift at the position x, and C is a non-zero constant.

11. The optical recording carrier according to claim 10, wherein the information track of the second substrate is a concentric track or a helical track.

12. The optical recording carrier according to claim 10, wherein the periodically undulated section in the information track of the second substrate is expressed as:

$$S(x)=A\sin(2\pi fx+\phi)$$

x is a position on the periodically undulated section, $S(x)$ is a shift at the position x, A is an undulation amplitude of the periodically undulated section, f is an undulation frequency of the periodically undulated section, and $\phi$ is an initial phase of the periodically undulated section.

13. The optical recording carrier according to claim 10, wherein the non-periodically undulated section in the information track of the second substrate comprises a first sub-section and a second sub-section, the first sub-section is expressed as $S(x)=C1$, the second sub-section is expressed as $S(x)=C2$, x is a position on the non-periodically undulated section, $S(x)$ is a shift at the position x, and C1 and C2 are two different constants.

14. The optical recording carrier according to claim 10, wherein the periodically undulated section and the non-periodically undulated section in the information track of the second substrate form a composite pattern, and the composite pattern is expressed as:

$$S(x)=A\sin(2\pi fx+\phi) \text{ when } 0\leq x<X1 \text{ and } X2\leq x<L;$$

$$S(x)=C \text{ when } X1\leq x<X2,$$

x is a position on the composite pattern, $S(x)$ is a shift at the position x, A is an undulation amplitude of the periodically undulated section, f is an undulation frequency of the periodically undulated section, $\phi$ is an initial phase of the periodically undulated section, L is the length of the composite pattern, X1 is a starting point of the non-periodically undulated section on the composite pattern, X2 is an end point of the non-periodically undulated section on the composite pattern, and C is a constant.

15. The optical recording carrier according to claim 1, wherein the optical recording carrier is an optical disk.

16. An information recording method, comprising:
generating an information signal, the information signal comprising at least one periodically undulated waveform and at least one non-periodically undulated waveform, wherein the non-periodically undulated waveform has at least one bias; and
indicating an information by using the bias of the non-periodically undulated waveform.

17. The information recording method according to claim 16, wherein the bias of the non-periodically undulated waveform is a positive bias or a negative bias, and different digital information is indicated by using the positive bias and the negative bias of the non-periodically undulated waveform.

18. The information recording method according to claim 16, wherein a clock signal is provided by using the periodically undulated waveform.

19. The information recording method according to claim 16, wherein the bias of the non-periodically undulated waveform comprises zero level, and a synchronous signal is provided by using the zero-level non-periodically undulated waveform.

20. The information recording method according to claim 16, wherein the periodically undulated waveform is expressed as:

$$Y(t)=A'\sin(2\pi ft+\phi)$$

Y(t) is an intensity, t is a time, A' is an amplitude, f is a frequency, and $\phi$ is an initial phase.

21. The information recording method according to claim 16, wherein the non-periodically undulated waveform comprises a first subwave and a second subwave, the first subwave is expressed as $Y(t)=C1$, and the second subwave is expressed as $Y(t)=C2$, Y(t) is an intensity, t is a time, and C1 and C2 are two different constants.

22. The information recording method according to claim 16, wherein the periodically undulated waveform and the non-periodically undulated waveform form a composite waveform for indicating the information, and the composite waveform is expressed as:

$$Y(t)=A'\sin(2\pi ft+\phi) \text{ when } 0\leq t<T1 \text{ and } T2\leq t<T; \text{ and}$$

$$Y(t)=C \text{ when } T1\leq t<T2,$$

Y(t) is an intensity, t is a time, A' is an amplitude, f is a frequency, $\phi$ is an initial phase, T is a period of the composite waveform, T1 is a starting point of the non-periodically undulated waveform in the composite waveform, T2 is an end point of the non-periodically undulated waveform in the composite waveform, and C is a constant.

23. The information recording method according to claim 22, wherein the period of the composite waveform is a multiple of the period of the periodically undulated waveform.

24. The information recording method according to claim 22, wherein the information comprises a digital information, a clock signal, a synchronous signal, or a combination of the digital information, the clock signal, and the synchronous signal.

25. A signal generating apparatus, adaptable to an information recording method, the signal generating apparatus comprising:
- a frequency oscillator, generating a constant-frequency signal;
- an address information encoder, generating an address signal; and
- an addressing signal generator, synthesizing the constant-frequency signal and the address signal to generate an information signal, wherein the information signal comprises at least one periodically undulated waveform and at least one non-periodically undulated waveform for indicating an information, and the non-periodically undulated waveform has a bias.

26. The signal generating apparatus according to claim 25, wherein the bias of the non-periodically undulated waveform is a positive bias or a negative bias.

27. The signal generating apparatus according to claim 25, wherein the periodically undulated waveform is expressed as:

$Y(t)=A' \sin(2\pi ft+\phi)$

Y(t) is an intensity, t is a time, A' is an amplitude, f is a frequency, and $\phi$ is an initial phase.

28. The signal generating apparatus according to claim 25, wherein the non-periodically undulated waveform is expressed as Y(t)=C, Y(t) is an intensity, t is a time, and C is a non-zero constant.

29. The signal generating apparatus according to claim 25, wherein the non-periodically undulated waveform comprises a first subwave and a second subwave, the first subwave is expressed as Y(t)=C1, the second subwave is expressed as Y(t)=C2, Y(t) is an intensity, t is a time, and C1 and C2 are two different constants.

30. The signal generating apparatus according to claim 25, wherein the addressing signal generator generates a composite waveform formed by the periodically undulated waveform and the non-periodically undulated waveform for indicating the information, and the composite waveform is expressed as:

$Y(t)=A' \sin(2\pi ft+\phi)$ when $0 \leq t<T1$ and $T2 \leq t<T$; and $Y(t)=C$ when $T1 \leq t<T2$, Y(t) is an intensity, t is a time, A' is an amplitude, f is a frequency, $\phi$ is an initial phase, T is a period of the composite waveform, T1 is a starting point of the non-periodically undulated waveform in the composite waveform, T2 is an end point of the non-periodically undulated waveform in the composite waveform, and C is a constant.

31. The signal generating apparatus according to claim 30, wherein the period of the composite waveform is a multiple of the period of the periodically undulated waveform.

32. An information reading apparatus, suitable for reading an information from an optical recording carrier, wherein the optical recording carrier has an information track, the information track comprises at least one periodically undulated section and at least one non-periodically undulated section for indicating the information, and the non-periodically undulated section has a non-zero shift, the information reading apparatus comprising:
- an optical pickup head, emitting a read beam on the information track;
- an photo detector, receiving a reflected beam from the information track to obtain a push-pull signal, wherein the push-pull signal comprises at least one periodically undulated waveform and at least one non-periodically undulated waveform respectively corresponding to the periodically undulated section and the non-periodically undulated section on the information track, and the non-periodically undulated waveform has at least one bias corresponding to the non-zero shift;
- a clock signal generator, generating a clock signal according to the push-pull signal;
- a decoder circuit, decoding the push-pull signal according to the clock signal to obtain the information; and
- a sampling circuit disposed between the photo detector and the decoder circuit for detecting the non-periodically undulated waveform in the push-pull signal.

33. The information reading apparatus according to claim 32 further comprising a frequency multiplier circuit for receiving the clock signal and multiplying the frequency of the clock signal, wherein the sampling circuit receives the push-pull signal and the clock signal from the frequency multiplier circuit, samples the push-pull signal according to the clock signal, and outputs a treated signal to the decoder circuit.

34. An optical recording carrier, comprising:
- a first substrate, having a information track, wherein the information track comprises at least one periodically undulated section and at least one non-periodically undulated section, the periodically undulated section and the non-periodically undulated section in the information track of the first substrate form a composite pattern, and the composite pattern is expressed as:

$S(x)=A \sin(2\pi fx+\phi)$ when $0 \leq x<X1$ and $X2 \leq x<L$; and $S(x)=C$ when $X1 \leq x<X2$, x is a position on the composite pattern, S(x) is a shift at the position x, A is a undulation amplitude of the periodically undulated section, f is a undulation frequency of the periodically undulated section, $\phi$ is an initial phase of the periodically undulated section, L is the length of the composite pattern, X1 is a starting point of the non-periodically undulated section on the composite pattern, X2 is an end point of the non-periodically undulated section on the composite pattern, and C is a non-zero constant; and
- a data read/write medium, located on the information track.

35. The optical recording carrier according to claim 34, wherein the length of the composite pattern is a multiple of the length of the periodically undulated section.

* * * * *